United States Patent
Foo et al.

(10) Patent No.: US 6,520,536 B2
(45) Date of Patent: Feb. 18, 2003

(54) METHOD AND APPARATUS FOR CONTROLLING AN OCCUPANT SIDE RESTRAINING DEVICE WITH ENHANCED SIDE SAFING FUNCTION

(75) Inventors: Chek-Peng Foo, Ann Arbor, MI (US); Huahn-Fern Yeh, Novi, MI (US); Scott Andrew William Martin, Waterford, MI (US); Baozhu Paula Li, Novi, MI (US); Shun-Hsin Chang, Novi, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/849,497

(22) Filed: May 4, 2001

(65) Prior Publication Data

US 2002/0163170 A1 Nov. 7, 2002

(51) Int. Cl.$^7$ ............................................. B60R 21/32
(52) U.S. Cl. ..................................... 280/735; 280/734
(58) Field of Search ................................ 280/735, 734, 280/806, 728.1; 180/274; 307/10.1

(56) References Cited

U.S. PATENT DOCUMENTS

| | | | |
|---|---|---|---|
| 4,836,024 A | | 6/1989 | Woehrl et al. |
| 5,173,614 A | * | 12/1992 | Woehrl et al. ............... 180/282 |
| 5,208,484 A | * | 5/1993 | Okano et al. ................ 180/274 |
| 5,262,949 A | | 11/1993 | Okano et al. |
| 5,484,166 A | | 1/1996 | Mazur et al. |
| 5,587,906 A | | 12/1996 | McIver et al. |
| 5,684,701 A | * | 11/1997 | Breed ........................ 180/282 |
| 5,702,124 A | * | 12/1997 | Foo et al. ................... 280/735 |
| 5,737,224 A | | 4/1998 | Jeenicke et al. |
| 5,740,041 A | | 4/1998 | Iyoda |
| 5,746,444 A | | 5/1998 | Foo et al. |
| 5,758,899 A | | 6/1998 | Foo et al. |
| 5,815,393 A | * | 9/1998 | Chae ......................... 180/282 |
| 5,826,902 A | | 10/1998 | Foo et al. |
| 5,899,949 A | | 5/1999 | Kincaid |
| 5,900,807 A | * | 5/1999 | Moriyama et al. .......... 180/282 |
| 6,036,225 A | | 3/2000 | Foo et al. |
| 6,095,554 A | * | 8/2000 | Foo et al. ................. 280/730.2 |
| 6,168,198 B1 | * | 1/2001 | Breed et al. ................ 280/735 |
| 6,236,922 B1 | * | 5/2001 | Andres ....................... 180/282 |
| 6,249,730 B1 | * | 6/2001 | Khairallah et al. ......... 514/152 |

FOREIGN PATENT DOCUMENTS

| | | |
|---|---|---|
| EP | 0531989 A1 | 3/1993 |
| EP | 0536624 A1 | 4/1993 |
| EP | 0693404 A3 | 1/1996 |
| EP | 0693404 A2 | 1/1996 |

OTHER PUBLICATIONS

An article entitled "Side Impact and Sensing" by Kevin Jost, May 1995, Automotive Engineering pp. 62–63.

An article entitled "Steuerung eines Mehr-fach-Ruckhaltesystems, Controls for a Multiple Passenger Restraint System", by Von Guido Wetzel, Oct. 1994, ATZ Automobiltechnische Zeitschrift, pp. 618–619. Appears to disclose a control arrangement for an occupant side restraining system.

Pending U.S. Yeh et al. patent application Ser. No. 09/589,444, filed Jun. 7, 2000 entitled Method and Apparatus for Controlling an Actuatable Restraint Device Using a Velocity/Displacement Based Safing Function With Immunity Box.

Pending U.S. Foo et al. patent application Ser. No. 09/723,390, filed Nov. 28, 2000 entitled Enhanced Occupant Spring Mass Model for Use With an Actuatable Restraint System Including Compensating for Monotonicity of Misuse Conditions.

* cited by examiner

Primary Examiner—Brian L. Johnson
Assistant Examiner—Kelly E Campbell
(74) Attorney, Agent, or Firm—Tarolli, Sundheim, Covell, Tummino & Szabo L.L.P.

(57) ABSTRACT

An apparatus (22) for controlling an actuatable side restraining device (24, 26) of a vehicle (20) includes crash sensors (28, 50, 52) sensing a vehicle crash condition and providing associated crash sensor signals (60, 62, 42) indicative thereof. An actuator controller (70) enables actuation of the actuatable side restraining device (24, 26) in response to enhanced discrimination and safing determinations.

18 Claims, 7 Drawing Sheets

METHOD AND APPARATUS FOR CONTROLLING AN OCCUPANT SIDE RESTRAINING DEVICE WITH ENHANCED SIDE SAFING FUNCTION

TECHNICAL FIELD

The present invention is directed to an occupant restraining system in a vehicle and specifically to a method and apparatus for controlling an actuatable, occupant side restraining system having an enhanced side safing function.

BACKGROUND OF THE INVENTION

Actuatable systems for restraining vehicle occupants during side impact crash events are known in the art. Such actuatable restraining devices include side air bags that are actuated in response to a detected side deployment vehicle crash condition. These side restraining devices are in addition to actuatable frontal restraining devices.

A controller typically controls actuation of an actuatable side restraining device in response to signals provided from one or more crash sensors that monitor for a sideways crash condition. U.S. Pat. No. 5,758,899 to Foo et al., assigned to TRW Inc., discloses a side actuatable restraining device that is actuated when (i) a first sideways oriented accelerometer provides a primary crash acceleration signal indicative of a deployment crash event, and (ii) a second sideways oriented accelerometer provides a safing crash signal indicative of a deployment crash event.

U.S. Pat. No. 5,826,902 to Foo et al., assigned to TRW Inc., discloses a side actuatable restraining device that is actuated when (i) a first sideways oriented accelerometer provides a discriminating crash acceleration signal indicative of a deployment crash event, and (ii) either (a) a second sideways oriented accelerometer provides a safing crash signal indicative of a deployment crash event, or (b) a third sideways oriented accelerometer provides a safing crash signal indicative of a deployment crash event.

SUMMARY OF THE INVENTION

In accordance with the present invention, an apparatus is provided for controlling an actuatable side restraining device of a vehicle. The apparatus includes actuator control means for enabling actuation of the actuatable side restraining device in response to enhanced discrimination and safing determinations.

In accordance with one aspect of the present invention, an apparatus is provided for controlling an actuatable restraining device of a vehicle. The apparatus includes a crash sensor sensing a vehicle crash condition and providing a crash sensor signal indicative thereof. A controller compares the crash sensor signal against an immunity threshold and enables actuation of the actuatable restraining device when the crash sensor signal is greater than the immunity threshold and for a time after the crash sensor signal becomes less than the immunity threshold.

According to another aspect of the present invention, a method is provided for controlling an actuatable side restraining device of a vehicle. The method includes the steps of sensing a vehicle crash condition and providing a crash acceleration signal indicative thereof, comparing the crash acceleration signal against an immunity threshold, and enabling actuation of the actuatable side restraining device when the crash acceleration signal is greater than the immunity threshold and for a time after the crash acceleration signal becomes less than the immunity threshold.

Other aspects of the present invention are set forth in the appended claims.

BRIEF DESCRIPTION OF THE DRAWINGS

Further features and advantages of the present invention will become apparent to those skilled in the art to which the present invention relates from reading the following detailed description with reference to the accompanying drawings, in which.

DETAILED DESCRIPTION

Figure 1:
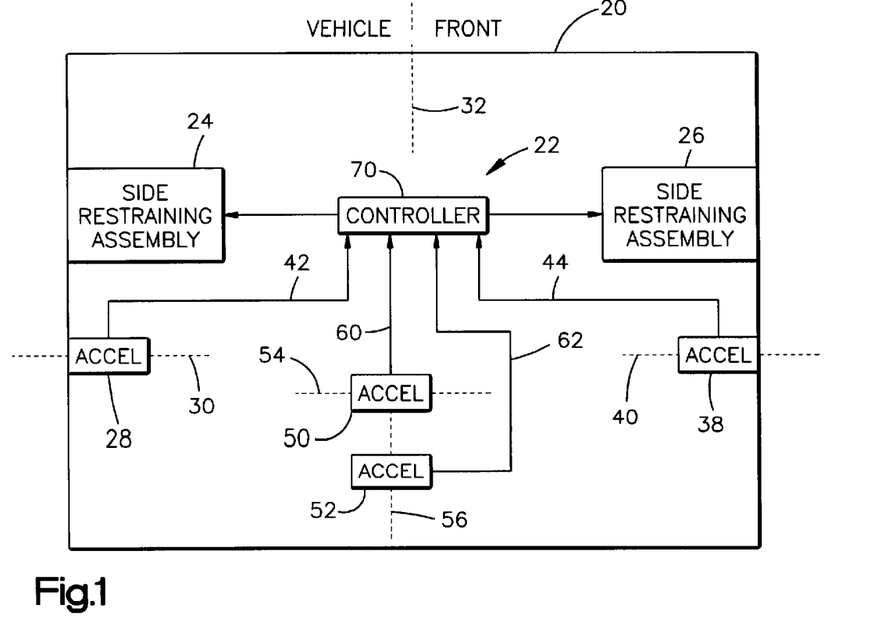
FIG. 1 is a block diagram of a vehicle having a side restraining system made in accordance with the present invention.

Referring to FIG. 1, a vehicle 20 includes an actuatable, side restraining apparatus 22, made in accordance with the present invention. The side restraining apparatus 22 includes an actuatable side restraining assembly 24 located on the driver's side of the vehicle 20 to enhance side protection for the vehicle driver. The side restraining apparatus 22 further includes an actuatable side restraining assembly 26 located on the passenger's side of the vehicle 20 to enhance side impact protection for the vehicle passenger. For the purposes of discussion, only the driver's side restraining assembly and its control is described in detail, it being understood that the passenger's side restraining assembly functions and is controlled in a similar manner.

The side restraining assembly 24 could, for example, be an air bag located in the side of the driver's seat, an air bag mounted in a side panel of the vehicle such as the driver's door, in the driver's armrest, or could be a driver's side air curtain.

The side restraining apparatus 22 includes a plurality of crash sensors, such as accelerometers, located at appropriate vehicle locations to sense vehicle crash conditions. Each accelerometer outputs an electric signal having a characteristic (e.g., frequency, amplitude, etc.) functionally related to the sensed crash acceleration along an axis of sensitivity of the accelerometer. In an exemplary embodiment of the present invention, the side restraining apparatus 22 includes four accelerometer crash sensors.

A first accelerometer crash sensor 28 with an axis of sensitivity 30, in accordance with one exemplary embodiment of the present invention, is mounted on the driver's side of the vehicle 20. For example, the accelerometer 28 can be located at the driver's side B-pillar location of the vehicle 20 with its axis of sensitivity 30 substantially perpendicular to a front-to-rear axis 32 of the vehicle 20. Alternatively, the first accelerometer crash sensor 28 could be mounted in a driver's side door, a side panel, a floor cross member, etc. on the driver's side of the vehicle 20.

A second accelerometer crash sensor 38 with an axis of sensitivity 40, in accordance with one exemplary embodiment of the present invention, is mounted on the passenger's side of the vehicle 20. For example, the second accelerometer crash sensor 38 can be located at the passenger's side B-pillar location of the vehicle 20 with its axis of sensitivity 40 substantially perpendicular to a front-to-rear axis 32 of the vehicle 20. Alternatively, the second accelerometer crash sensor 38 could be mounted in the passenger's side door, a side panel, a floor cross member, etc. on the passenger's side of the vehicle 20.

The sensors 28, 38 sense vehicle crash acceleration having transverse crash acceleration components, i.e., acceleration components transverse of the front-to-rear axis 32 of the vehicle 20. The sensor 28 provides a crash acceleration signal 42 indicative of the transverse crash acceleration sensed by the sensor 28. The sensor 38 provides a crash acceleration signal 44 indicative of the transverse crash acceleration sensed by the sensor 38. The crash acceleration signals 42 and 44 each have an electrical characteristic, e.g., frequency, amplitude, etc., functionally related to the sensed crash acceleration along their respective axes of sensitivity 30, 40.

The two other accelerometer crash sensors 50, 52 are, in accordance with an exemplary embodiment of the present invention, mounted at substantially central locations of the vehicle 20 such as at the vehicle transmission tunnel. The crash accelerometer sensor 50 has its axis of sensitivity 54 oriented so as to be substantially perpendicular to the front-to-rear axis 32 of the vehicle 20. This central crash acceleration sensor 50 senses crash acceleration components in a direction transverse to the front-to-rear axis 32 of the vehicle 20. A crash acceleration signal 60 is provided from the sensor 50 having an electrical characteristic, i.e., frequency, amplitude, etc., that is functionally related to the transverse crash acceleration of the vehicle such as occurs during a side impact crash event.

The other centrally located accelerometer crash sensor 52 is mounted to the vehicle 20 such that its axis of sensitivity 56 is substantially parallel to the front-to-rear axis 32 of the vehicle 20. The accelerometer crash sensor 52 provides a crash acceleration signal 62 having an electrical characteristic, e.g., frequency, amplitude, etc., that is indicative of crash acceleration components in the fore/aft direction of the vehicle 20.

The outputs 42, 44, 60, and 62 from sensors 28, 38, 50, and 52, respectively, are connected to a controller 70. Preferably, the controller 70 is a microcomputer programmed to execute a control process in accordance with the present invention. It is to be appreciated that the functions performed by the controller 70 could be realized using separate circuit components. The sensor signals 42, 44, 60, and 62 are connected to analog-to-digital ("A/D") inputs of the controller 70. In response to these crash acceleration signals, the controller 70 controls actuation of the actuatable restraining devices of assemblies 24, 26 in accordance with the present invention. For the purpose of explanation, only control of the driver's side restraining assembly is explained in detail, it being understood that control of the passenger's side restraining assembly is similar.

The controller 70 determines several values in response to the monitored crash acceleration signals. In particular, the controller 70 determines the absolute value of a moving average of the crash acceleration signal 42 from accelerometer 28. The moving average is a sum of a predetermined number of acceleration values, e.g., 6 consecutive values. When a new value is monitored, the oldest value is removed to derive a new summed value of 6 samplings. Since the sum is "moving" in time, it is referred to herein as a moving average. The controller then determines the absolute value of the moving average. The absolute value of the moving average from accelerometer 28 is referred to herein as |A_MA_28_Y|.

The controller 70 further determines the absolute value of the moving average from accelerometer 50 referred to as |A_MA_50_Y|. The absolute value of the moving average accelerometer 38 is determined and referred to as |A_MA_38_Y|. The controller further determines a crash displacement value (double integral of acceleration) from sensor 52 referred to as DISPL_52_X. A crash velocity value (integral of acceleration) is determined from the accelerometer 50 and is referred to herein as Vel_50_Y. Y is the direction transverse to the front-to-rear axis 32 and X is the direction parallel with the front-to-rear axis 32.

Figure 2:
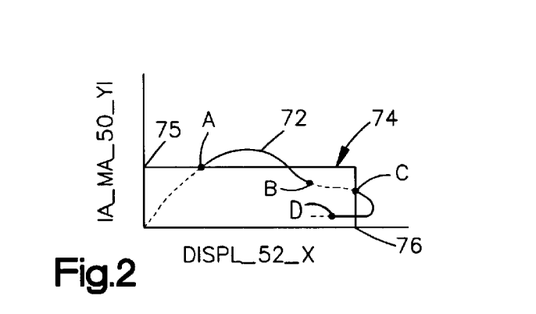
FIG. 2 is a graphical representation of the absolute value of crash acceleration as a function of crash displacement for a particular crash event and showing a safing immunity box and enhanced safety function in accordance with the present invention.

With reference to FIG. 2, a moving average 72 of acceleration samplings from the sensor 50 |A_MA_50_Y| is shown plotted as a function of a determined crash displacement value DISPL_52_X. The sensor value |A_MA_50_Y| is used as a safing function in a control algorithm for actuating the side restraining device. A side discrimination value using the values |A_MA_28_Y| determined from side acceleration sensor 28 as a function of Vel_50_Y is used to determine if a deployment crash event is occurring for which it is desirable to deploy or actuate the side restraint of the side restraining assembly 24. Before actuation can occur, a safing value determined from the central accelerometer 50 as a function of DISPL_52_X must also indicate the occurrence of a deployment side crash condition.

A safing immunity box 74 is graphically depicted. The purpose of the immunity box is to filter misuse events. Misuse events include hammer blows, road bumps, door slams, etc., which are events which produce signals from the accelerometers but are non-deployment events. The side restraining assembly 24 is enabled to be actuated in response to the acceleration based metric values in accordance with a control algorithm. The immunity box is represented by values of determined acceleration 75 and displacement 76 below which the restraining device can not be actuated. It is only after the determined acceleration values or displacement values exceed these thresholds 75, 76 and are, therefore, outside of the immunity box that actuation of the restraining device is normally permitted in responsive to crash metric determinations. Accordingly, the term "immunity" is, at times, used herein when discussing threshold values that define whether or not an actuation of the restraining device is permitted. The immunity box 74 defines an area bounded by a predetermined value 75 of |A_MA_50_Y| and 76 DISPL_52_X. When the determined value of |A_MA_50_Y| is within the area of the safing immunity box 74, the safing function is OFF and, therefore, actuation of the actuatable restraint device can not occur. If the value

|A_MA_50_Y| is outside of the immunity box 74, the safing function is ON and, therefore, the actuatable restraining device can be actuated. In accordance with the present invention, the time period in which the safing function is ON is extended or enhanced after the value of |A_MA_50_Y| reenters the safing immunity box 74.

The curve 72 of |A_MA_50_Y| values, for illustration purposes only, for a particular crash event is shown in FIG. 2. From the origin to a point A, the values are within the immunity box 74. During this time period, the controller 70 will indicate that the safing function is OFF and the restraining device portion of the assembly 24 will be prevented from being actuated. The curve 72 exits the immunity box 74 at point A when the moving average value |A_MA_50_Y| is greater than the predetermined safing threshold value 75. The controller 70 then turns the safing function ON thereby enabling actuation of the restraining device. The curve 72 then reenters the immunity box 48. If one were to normally use an immunity box, the safing function would immediately turn OFF. It has been discovered that by retaining the safing function ON for a time period after initial reentry into the restraining box 74 serves to "catch" certain types of crash events and allow actuation of the restraining device. The controller 70 continues to hold the safing function ON until the |A_MA_50_Y| value as a function of DISPL_52_X reaches point B (as a function of time). The present invention permits actuation of the actuatable restraining device until point B by keeping the safing function ON until the crash curve 72 reaches point B (as a function of time).

For illustration purposes only, the curve 72 of values again exits the immunity box 74 at point C on the graph. At point C, the value of the crash metric value DISPL_52_X is greater than the predetermined safing immunity value 76. This would result in the controller 70 turning the safing function ON. The curve 72 then reenters the immunity box 74. In accordance with the present invention, the controller 70 keeps the safing function ON for a predetermined time after the reentry of values back into the immunity box 74. In particular, the safing function is retained ON until the curve reaches a point D (as a function of time). The present invention permits actuation of the actuatable restraining device from the exit of values at point C to the values reach point D (as a function of time) by keeping the safing function ON even though the values have reentered the immunity box 74.

It is to be appreciated that the values 75, 76 and points B and D are predetermined to achieve desired performance for a particular vehicle platform for particular crash events. These values can be empirically determined or based on models.

It should also be appreciated that no actuation of the restraining device of the side restraining assembly 24 will occur unless there is an overlap in time of the safing function being ON and a discrimination metric also being ON. Discrimination metric being ON will be better understood with reference to FIGS. 3 and 4.

Figure 3:
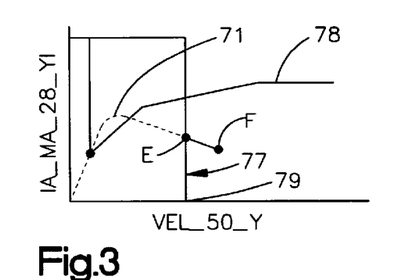
FIG. 3 is a graphical representation of the absolute value of crash acceleration as a function of crash velocity for a particular crash event and showing a crash immunity box and enhanced discrimination function in accordance with the present invention.

FIG. 3 illustrates a graphical representation of a discrimination decision in accordance with the present invention. The crash acceleration value |A_MA_28_Y| as a function of Vel_50_Y is used to discriminate the occurrence of a deployment crash event, i.e., one for which it is desirable to actuate the side restraining device of the side restraining assembly 24. The curve of values is designated 71. Also shown is an discrimination immunity box 77 defined by predetermined immunity thresholds of |A_MA_28_Y| and Vel_50_Y. Shown is a discrimination threshold value 78 that varies as a function of velocity values Vel_50_Y. When the value |A_MA_28_Y| is greater than the discrimination threshold 78 and outside of the immunity box 77, a deployment event is occurring and the controller 70 would turn the discrimination function ON. The immunity thresholds that define the immunity box 77 and the discrimination threshold 78 are empirically determined or determined from models of a particular vehicle platform of interest to achieve a desired control of the restraining devices.

In accordance with the present invention, the discrimination function is in an ON condition under certain circumstances even when the value |A_MA_28_Y| as a function of Vel_50_Y is less than the threshold value 78. This, again, allows for "catching" of certain types of crash events and permitting actuation of the restraining device of the side restraining assembly 24.

The velocity-based immunity threshold Vel_50_Y is shown at 79 in FIG. 3. The exemplary curve 71 is a plot of the crash metric value |A_MA_28_Y| as a function of Vel_50_Y for a particular crash event. The exemplary crash curve 71 illustrated crosses the discrimination threshold 78 while being within the immunity box 77, i.e., less than the immunity boundary or threshold 79 VEL_50_Y and the boundary or threshold |A_MA_28_Y|. At this point, the absolute value of crash metric |A_MA_28_Y| is greater than the discrimination threshold 78. Because the value or the data points represented by the curve 71 are still within the immunity box 77, the discrimination function within the controller 70 is maintained in an OFF condition not allowing actuation of the restraining device. At some point, the value of the crash metric |A_MA_28_Y| as a function of VEL_50_Y is greater than the immunity boundary value 79. This occurs at point E shown in the graph.

In accordance with the present invention, the discrimination function is turned ON at point E even though the value |A_MA_28_Y| is less than the discrimination threshold value 78 and is maintained ON to point F (as a function of time) on the curve. The controller 70 sets an internal flag condition indicating that the curve 71 once exceeded the value of the discrimination threshold 78. When the values of curve 71 are greater than the boundary value 79, the discrimination function is turned ON until point F (as a function of time) is reached. If the safing function is ON at this same time when the discrimination function is ON, the restraining device is actuated.

Figure 4:
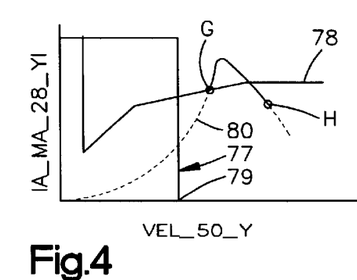
FIG. 4 is a graphical representation of the absolute value of crash acceleration as a function of crash velocity for a particular crash event different from that shown in FIG. 3 and also showing a crash immunity box and enhanced discrimination function in accordance with the present invention.

With reference now to FIG. 4, another exemplary crash curve 80 is illustrated for a different crash event. In FIG. 4, the crash curve 80 crosses the discrimination threshold 78 after the curve has exited the immunity box 77. More particularly, the crash curve 80 crosses the discrimination threshold 78 at point G. At point G, the absolute value of the crash metric |A_MA_28_Y| is greater than the discrimination threshold 78 and the value of immunity boundary 79 is exceeded.

In accordance with the present invention, the controller will turn the discrimination function ON at point G. At some point in the crash event, the value |A_MA_28_Y| becomes less than the discrimination threshold 78. Also, in accordance with the present invention, the controller 70 maintains the discrimination function ON for a predetermined time period which occurs in the illustration at point H (as a function of time). In accordance with the present invention, the discrimination function is ON for the time period during which the crash curve 80 is between points G and H. It should be appreciated that the controller maintains the discrimination function in the ON condition even though the values |A_MA_28_Y| drop below the discrimination threshold 78. If the safing function is ON during this same time period, the restraining device of the side restraining assembly 24 will be actuated, i.e., when and if the ON conditions of the safing function and the discrimination function overlap in time.

Figure 5A:
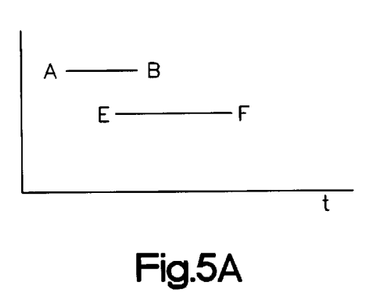
FIGS. 5A–5D are graphical representations of the simultaneous occurrence of enhanced control signals in accordance with the present invention for the crash conditions depicted in FIGS. 2–4.

Referring to FIG. 5A, the line from point A to point B illustrates the time period wherein the safing function is ON as determined by the controller 70 (FIG. 2). The line from point E to point F illustrates the time period wherein the discrimination function is ON as determined by the controller 70 (FIG. 3). In accordance with the present invention, at the point in time when line A–B and line E–F overlap, the actuatable restraining device is actuated. The overlap of these lines illustrates the simultaneous occurrence of an affirmative safing signal (FIG. 2) and an affirmative discrimination signal (FIG. 3). The extension of the ON time the safing function and/or the discrimination function permits the "catching" of a crash event that may otherwise not be "caught."

Figure 5B:
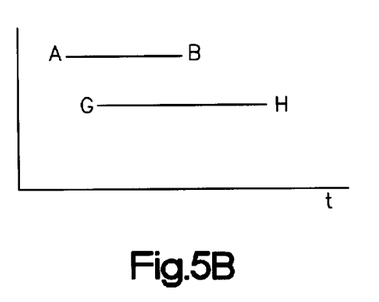

With respect to FIG. 5B, the line from point A to point B is as described above, i.e., the safing function is ON. The line from point G to point H illustrates the time period wherein an affirmative discrimination signal is provided (FIG. 4). In accordance with the present invention, whenever lines A–B and G–H overlap, the actuatable restraining device is actuated. The overlap of these lines illustrates the simultaneous occurrence of an affirmative safing signal (FIG. 2) and an affirmative discrimination signal (FIG. 4).

Figure 5C:
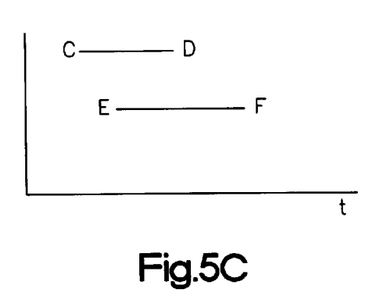

With reference to FIG. 5C, the line C–D indicates the period of time wherein the controller determines that the safing function is ON. The line E–F is when the controller determines that the discrimination function is ON. In accordance with the present invention, whenever the lines C–D and E–F overlap, the actuatable restraining device is actuated. The overlap of these lines illustrates the simultaneous occurrence of an affirmative safing signal (FIG. 2) and an affirmative discrimination signal (FIG. 4).

Figure 5D:
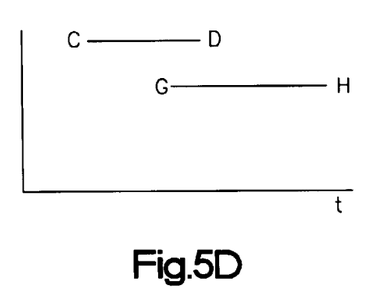

With reference FIG. 5D, the affirmative determination of the safing function between points C–D is shown. Also, the occurrence of an affirmative determination of the discrimination function between points G–H is shown. In accordance with the present invention, the actuatable restraining device is actuated at the point in time when the lines C–D and G–H overlap. The overlap of these lines illustrates the simultaneous occurrence of an affirmative safing determination (FIG. 2) and an affirmative discrimination determination (FIG. 4).

Figure 6:
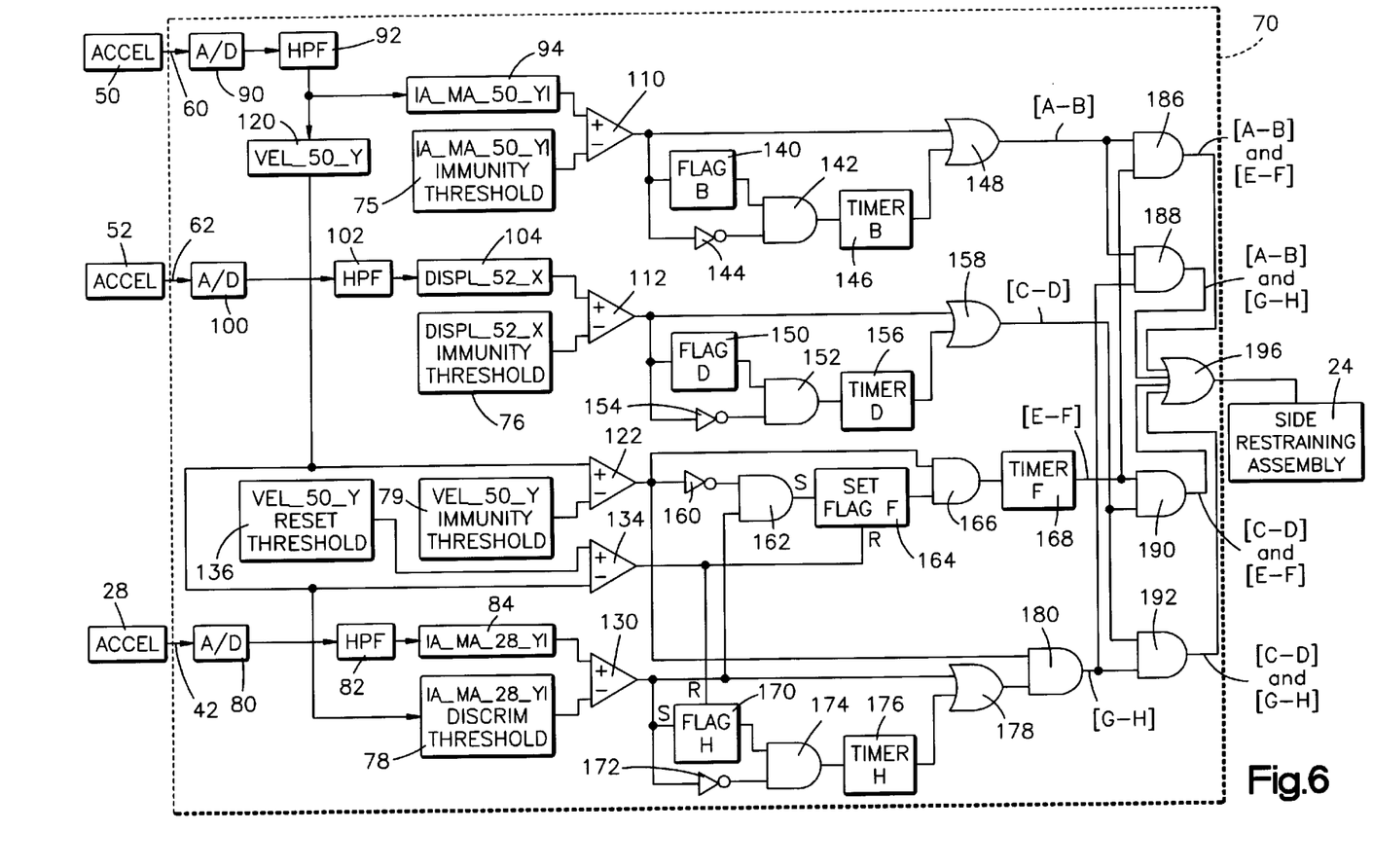
FIG. 6 is a schematic block diagram showing control logic followed by the controller of FIG. 1 in accordance with the present invention.
Figure 7A:
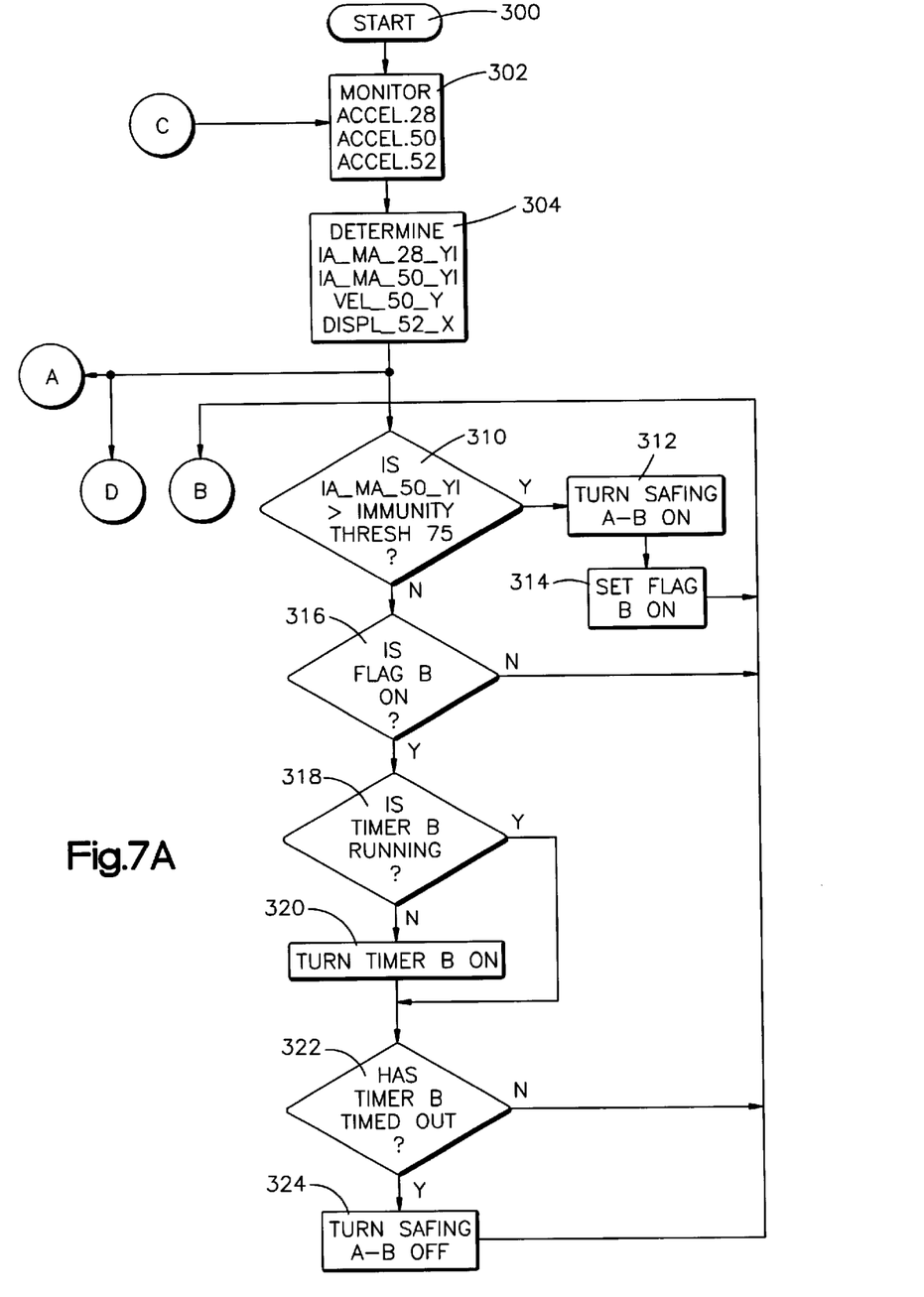
FIGS. 7A–7D are flow-charts of a control process followed by the controller of FIG. 1 in accordance with the present invention.
Figure 7B:
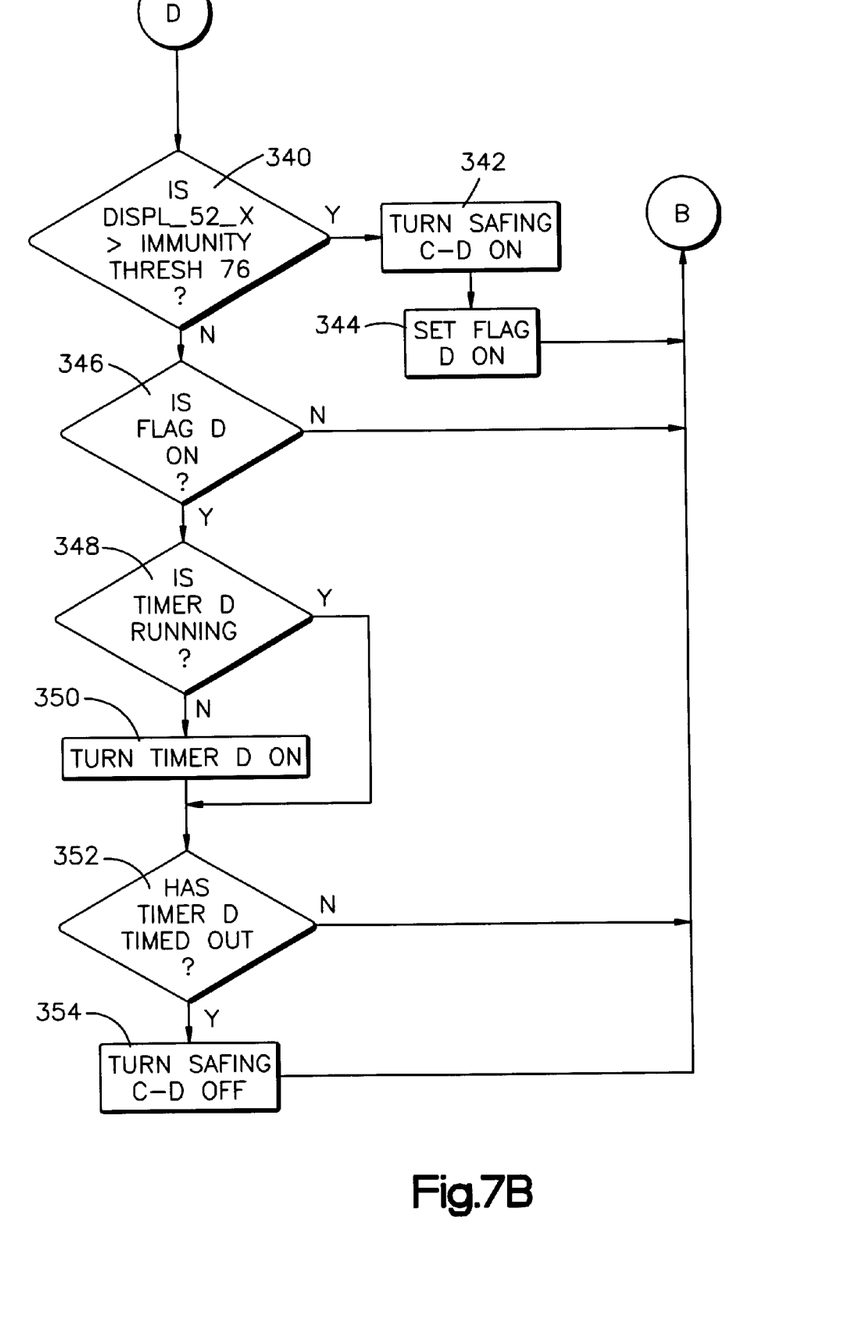
Figure 7C:
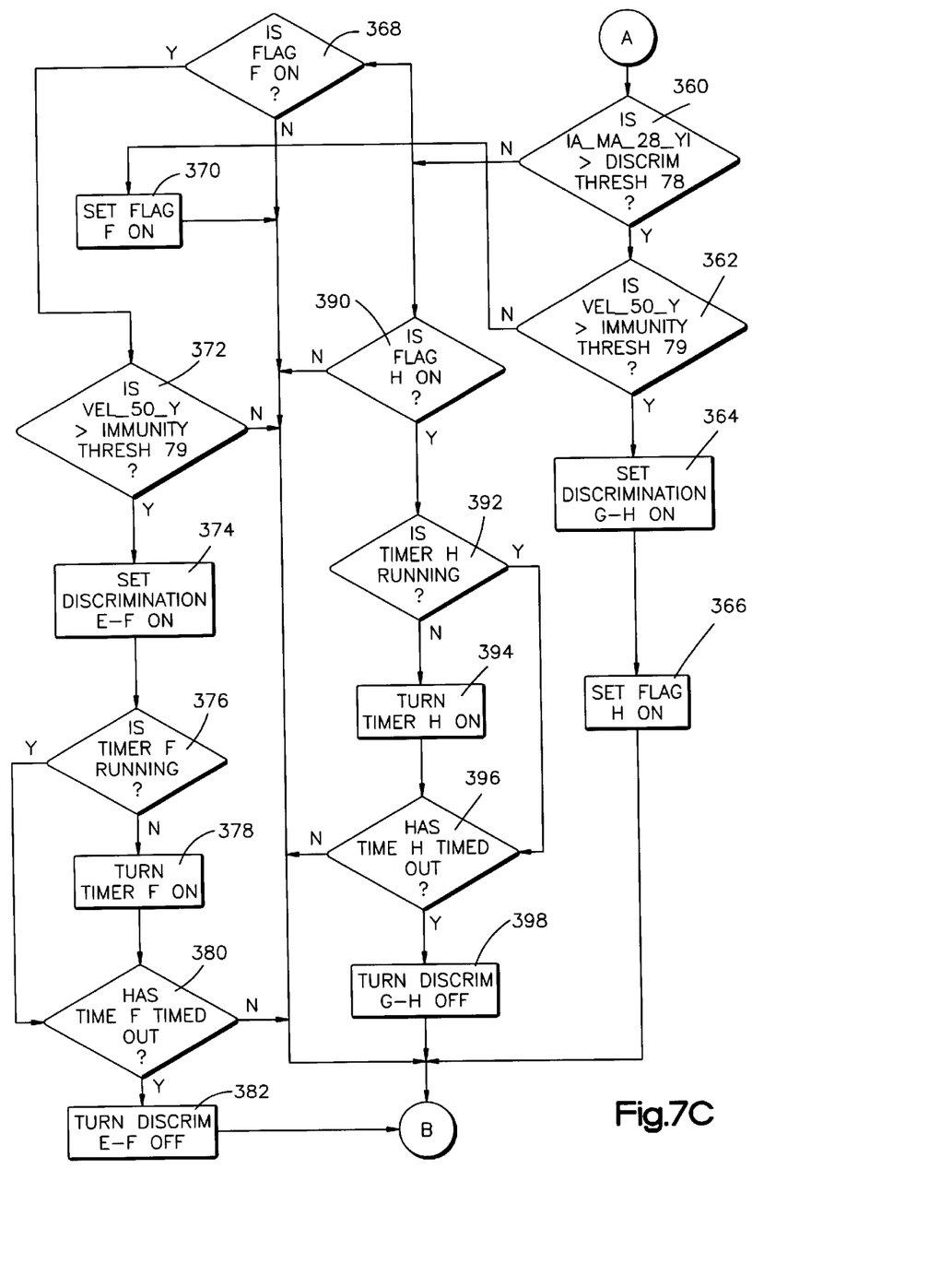
Figure 7D:
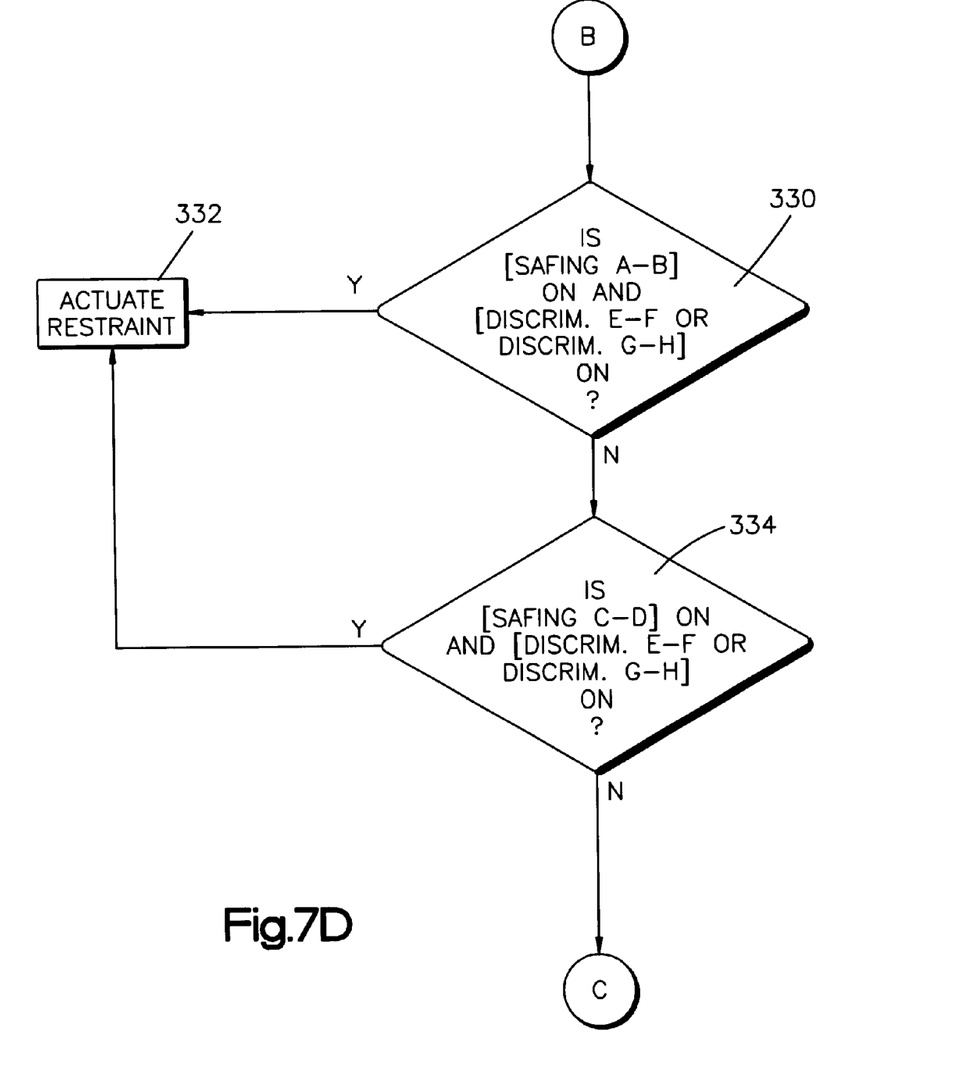

Referring to FIG. 6, a functional block diagram shows the functions performed by the controller 70 in accordance with the present invention to achieve the control of the restraining device as discussed above. In the microcomputer embodiment of the present invention, these functions are performed by the controller following program code. In a separate circuit embodiment of the present invention, these functions would be performed using separate circuit elements.

Sensors 28, 50, and 52 each output an associated signal 42, 60, and 62, respectively, having a characteristic indicative of crash acceleration components along their associated axis of sensitivity. It is to be appreciated that any of several known crash metrics could be used to determine a crash value that could be used for discrimination purposes or for safing purposes. The term "crash metric" as used herein means a measurement of a crash characteristic such as acceleration, a moving average of acceleration, crash energy (acceleration squared), and/or the absolute value of an acceleration based value. Other crash metrics that are useful in the analysis of a crash event are crash velocity, crash displacement, and crash jerk. A crash velocity based crash metric includes the integral of crash acceleration. A crash displacement based crash metric includes the double integral of crash acceleration. A jerk based crash metric includes the derivative of acceleration.

Each of the acceleration signals 42, 60, 62 has a crash characteristic indicative of a sensed crash event into the side of the vehicle 20. Prior to processing by the controller 70, each of these signals could be filtered to remove signal characteristics not useful in determining the occurrence of a crash event. Signal 42 (may be pre-filtered) from sensor 28 is connected to an A/D converter function 80 of the controller 70 where the analog value of the signal from the accelerometer is converted to a digital value. In a microcomputer embodiment of the present invention, the A/D input of the microcomputer is used. The converted signal is then filtered using a high pass digital filter 82. The absolute value of the moving average of the filtered signal is then determined by an absolute value determining function 84 to yield a signal having a value designated as |A_MA_28_Y|. In this designation, "A" is for acceleration, "MA" is for moving average, "28" is for sensor 28, and "Y" indicates that the axis of sensitivity of the sensor 28 is in the Y direction, i.e., transverse to the front-to-rear axis 32 of the vehicle 20.

Signal 60 from sensor 50 is connected to an A/D converter function 90 of controller 70 where the analog signal from the accelerometer (may be pre-filtered) is converted to a digital value. The converted signal is then filtered using a high pass digital filter 92. The absolute value of the moving average of the filtered signal is then determined by an absolute value determining function 94 to yield a signal having a value designated as |A_MA_50_Y|. In this designation, "A" is for acceleration, "MA" is for moving average, "50" is for accelerometer 50 and "Y" is for the direction of the axis of sensitivity for the sensor 50.

Signal 62 from sensor 52 is connected to an A/D converter function 100 where the analog value of the sensed acceleration from accelerometer 52 (may be pre-filtered) is converted to a digital value. The converted signal is then filtered using a high pass digital filter 102. A crash displacement value is determined in a crash displacement determining function 104. This determined value is designated as DISPL_52_X. In this designation, "DISPL" means displacement, "52" is for sensor 52 and "X" indicates that the axis of sensitivity for the sensor is in the X direction, i.e., parallel to the front-to-rear axis of the vehicle 20.

The |A_MA_50_Y| value 94 is connected to one input of a comparator function 110. The safing immunity threshold 75 is connected to the other input of comparator function 110. This threshold 75 is the boundary value shown in FIG. 2 defining one side of the immunity box 74. It is to be appreciated that the threshold value(s) that define the immunity boxes and the discrimination threshold discussed herein are determined using empirical methods based on crash data for a particular vehicle platform of interest. If the value of signal |A_MA_50_Y| is greater than the safing immunity threshold 75, comparator function 110 outputs a digital HIGH or a TRUE. Otherwise, comparator 110 outputs a digital LOW or NOT-TRUE.

Similarly, the relative displacement value DISPL_52_X 104 is connected to one input of a comparator function 112. The relative displacement immunity threshold 76 is connected to the other input of comparator function 112. This is the same boundary value defining one side of the immunity box 74 shown in FIG. 2. Comparator function 112 outputs a digital HIGH if the relative displacement value 104 is greater than the displacement immunity threshold 76. Otherwise, comparator 112 outputs a digital LOW.

The safing immunity threshold 75 and the safing immunity threshold 76 define the boundaries of the immunity box 74. As mentioned, the purpose of the immunity box is to filter misuse events. Misuse events include hammer blows, road bumps, door slams, etc., which are events which produce signals from the accelerometer but are non-deployment events. The side restraining assembly 24 is enabled to be actuated in response to the acceleration based metric values in accordance with a control algorithm. The immunity box 74 is represented by values of determined acceleration $|A\_MA\_50\_Y|$ and displacement $DISPL\_52\_X$ below which the restraining device is not normally actuated. It is only after the determined acceleration values or displacement values exceed these immunity thresholds 75, 76 and are, therefore, outside of the immunity box 74 that actuation of the restraining device is permitted in responsive to crash metric determinations. Accordingly, the term "immunity" is, at times, used herein when discussing threshold values that define whether or not an actuation of the restraining device is normally permitted.

A crash velocity value 120 designated $VEL\_50\_Y$ is determined from the centrally located accelerometer 50 and the determined velocity value is supplied at one input of comparator function 122. The velocity-based immunity threshold 79 is provided to the other input of comparator function 122. Comparator function 122 compares the values of its inputs and provides a digital HIGH when the determined velocity value $VEL\_50\_Y$ 120 is greater than the immunity threshold 79. Otherwise, comparator function 122 provides a digital LOW.

An absolute value 84 of the acceleration signal 42 $|A\_MA\_28\_Y|$ is determined from the output of the accelerometer 28 (may be pre-filtered) and is provided to one input of comparator function 130. The discrimination threshold 78 is provided to the other input of comparator function 130. The discrimination threshold value 78 varies as a function of the determined velocity value $Vel\_50\_Y$ 120. Comparator function 130 compares its two input values and outputs a digital HIGH or TRUE if the absolute value 84 of the acceleration signal $|A\_MA\_28\_Y|$ is greater than the discrimination threshold 78. Otherwise, comparator 130 outputs a digital LOW.

The determined velocity value $Vel\_50\_Y$ is also provided to one input of comparator function 134. A $Vel\_50\_Y$ reset threshold value 136 is provided as the other input of comparator function 134. Comparator function 134 provides a digital HIGH or TRUE if the reset threshold 136 is greater than the velocity value $Vel\_50\_Y$ 120. Otherwise, comparator 134 provides a digital LOW.

The output of comparator function 110 is provided to a flag B function 140. The flag B function outputs a digital LOW in its reset condition. Once a digital HIGH is received from the output of comparator function 110, the flag B function 140 latches that event and continuously outputs a digital HIGH until reset. The output of the flag B function 140 is provided to one input of AND function 142.

The output of comparator function 110 is inverted by an inverter function 144. The inverter function 144 inverts the signal received at its input. Accordingly, inverter 144 outputs a digital HIGH when comparator function 110 outputs a digital LOW. Similarly, the inverter 144 outputs a digital LOW when comparator function 110 outputs a digital HIGH. The output of inverter 144 is provided to the second input of the AND function 142.

AND function 142 provides a digital HIGH when both of its inputs receive a digital HIGH. Otherwise, AND function 142 provides a digital LOW. The output of AND function 142 is provided to a timer B function 146. The timer B function 146 acts as a temporary latch that will output a digital HIGH or TRUE beginning when it receives a digital HIGH at its input and continues to output a digital HIGH for a predetermined time period even though its input conditions change. After the time period, the timer B function 146 outputs a digital LOW. After timer B times out, i.e., switches from a HIGH to a LOW, it resets flag B.

The output of the timer B function 146 is provided to one input of the OR function 148. The output of comparator function 110 is provided to the other input of the OR function 148. When either input of OR function 148 is a digital HIGH, OR function 148 outputs a digital HIGH. Otherwise, OR function 148 outputs a digital LOW. The output of OR function 148 is HIGH or ON when the determined value $|A\_MA\_50\_Y|$ exceeds immunity threshold 75 and for the time-out of timer B, i.e., the safing function is ON for the time from A to B in FIG. 2.

The output of comparator 112 is provided to a flag D function 150. The flag D function outputs a digital LOW in its reset condition. When a digital HIGH is provided to the flag D function 150, the function 150 continuously outputs a digital HIGH until again reset. The output of the flag D function is connected to one input of AND function 152.

The output of the comparator function 112 is also provided to an inverter function 154. The inverter function 154 digitally inverts the signal received at its input. Accordingly, when a digital HIGH is provided to the input of the inverter 154, the inverter outputs a digital LOW. Likewise, when a digital LOW is provided to the input of the inverter 154, the inverter outputs a digital HIGH. The output of the inverter 154 is provided to the other input of AND function 152. When a digital HIGH is received at both of its inputs, AND function 152 outputs a digital HIGH or TRUE. Otherwise, AND function 152 outputs a digital LOW.

The output of AND 152 is provided to a timer D function 156. The timer D function 156 functions as a temporary latching function. When a digital HIGH is provided at the input of timer D function 156, the timer outputs a digital HIGH for a predetermined time period. Once the predetermined time period runs, its output returns to a digital LOW state. After timer D times out, i.e., switches from a HIGH to a LOW, it resets flag D.

The output of timer D function 156 is provided to one input of OR function 158. The output of comparator function 112 is provided to the other input of OR function 158. When a digital HIGH is received at any or all of the inputs of OR function 158, OR function 158 outputs a digital HIGH. OR function 158 outputs a HIGH when 112 is HIGH and for the time-out of timer 156, i.e., the safing function is ON for the time between points C–D of FIG. 2. Otherwise, OR function 156 outputs a digital LOW.

The output of comparator 122 is provided to an inverter function 160. The inverter function 160 inverts the signal received at its input. Accordingly, inverter function 160 outputs a digital HIGH when it receives a digital LOW from comparator 122. Likewise, inverter function 160 outputs a digital LOW when it receives a digital HIGH from comparator 122.

The output of inverter 160 is provided to one input of AND function 162. The output of comparator 130 is provided to the other input of AND function 162. When a digital HIGH is received at both of its inputs, AND function 162 outputs a digital HIGH or TRUE. Otherwise, AND function 162 outputs a digital LOW.

The output of AND function is provided to the set input "S" of flag F function 164. The flag function 164 performs a latching function. When a digital HIGH is received at the set input S of flag F function 164, the function 164 outputs a digital HIGH until the function 164 is reset. The flag function 164 is reset when a digital HIGH is applied to its reset input "R".

The output of comparator 134 controls the reset input R of flag function 164. When a digital HIGH is applied to reset input R, the function 164 outputs a digital LOW until the function 164 is again set by a digital HIGH being applied to its set S input. Accordingly, the flag F function 164 is reset to output a digital LOW when the determined velocity value VEL__50__Y is less than the value of the reset threshold 136.

The output of flag F function 164 is provided to one input of AND function 166. The output of the comparator 122 is provided to the other input of AND function 166. When a digital HIGH is received at both inputs of AND function 166, it outputs a digital HIGH. Otherwise, AND function 166 outputs a digital LOW.

The output of AND function 166 is provided to a timer function F 168. When a digital HIGH is received at the input of timer function F 168, timer F 168 outputs a digital HIGH for a predetermined time period. Such a HIGH would occur between points E–F shown in FIG. 3 indicating that the discrimination function is ON or HIGH. Timer F 168 outputs a digital LOW all other times. After timer F times out, i.e., switches from a HIGH to a LOW, it resets flag F.

The output of comparator 130 is provided to a set input S of flag function H 170. When a digital HIGH is received at the set input S of flag function H 170, the flag function 170 outputs a digital HIGH until the function 170 is reset. The function 170 is reset when a digital HIGH is provided to its reset input R.

The output of comparator 134 is provided to the reset input R of the flag function H 170. When a digital HIGH is received at the reset input R of the flag H function 170, the function 170 is reset and outputs a digital LOW until the function 170 is again set by a digital HIGH being connected to the set input S. The flag H function 170 is reset when the velocity value VEL__50__Y drops below the value of the reset threshold 136.

The output of comparator 130 is provided to inverter function 172. The inverter 172 inverts the signal which it receives. Accordingly, inverter 172 outputs a digital LOW when it receives a digital HIGH from comparator 130. Likewise, inverter 172 outputs a digital HIGH when it receives a digital LOW from comparator 130.

The output of flag H function 170 is provided to one input of the AND function 174. The output of inverter 172 is connected to the other input of the AND function 174. When a digital HIGH is received at both inputs of AND function 174, it outputs a digital HIGH. Otherwise, AND function 174 outputs a digital LOW.

The output of AND function 174 is connected to timer function H 176. When a digital HIGH is applied to the input of timer function 176, it outputs a digital HIGH for a predetermined time period. Timer function H 176 outputs a digital LOW all other times. After timer H times out, i.e., switches from a HIGH to a LOW, it resets the flag H.

The output of timer function H 176 is applied to one input of OR function 178. The output of comparator 130 is applied to the other input of the OR function 178. When a digital HIGH is received at any or all of the inputs of OR function 178, it outputs a digital HIGH. Otherwise, it outputs a digital LOW.

The output of OR function 178 is provided to one input of AND function 180. The output of comparator 122 is provided to the other input of AND function 180. When a digital HIGH is received at both inputs of AND function 180, it outputs a digital HIGH. This represents the time between points G–H in FIG. 4 and the time when the discrimination function is ON or HIGH. Otherwise, the AND function 180 outputs a digital LOW.

The output of OR function 148 is provided to one input of an AND function 186. The output of timer F function 168 is provided to the other input of AND function 186. When a digital HIGH is received at both inputs of AND function 186, it outputs a digital HIGH. Otherwise, it outputs a digital LOW.

The output of the OR function 148 is also provided to one input of AND function 188. The output of AND function 180 is provided to the other input of AND function 188. When a digital HIGH is received at both inputs of AND function 188, it outputs a digital HIGH. Otherwise, it outputs a digital LOW.

The output of timer function F 168 is provided to one input of AND function 190. The output of OR function 158 is connected to the other input of AND function 190. When a digital HIGH is received at both inputs of AND function 190, it outputs a digital HIGH. Otherwise, AND function 190 outputs a digital LOW.

The output of OR function 158 is provided to one input of AND function 192. The output of AND function 180 is provided to the other input of AND function 192. When a digital HIGH is received at both inputs of AND function 192, AND function 192 outputs a digital HIGH. Otherwise, it outputs a digital LOW.

The output of AND function 186, the output of AND function 188, the output of AND function 190, and the output of AND function 192 are all provided to an OR function 196. When any one or more of the inputs of OR function 196 receives a digital HIGH, OR function 196 outputs a digital HIGH. Otherwise, it outputs a digital LOW.

The output of OR function 196 is connected to and controls the side restraining assembly 24. In particular, the output of the OR function 196 would be connected to a drive circuit that is, in turn, connected to a squib. When the output of the OR function 196 goes HIGH, the squib would be actuated in a manner that would actuate the restraining device, e.g., the air bag, of the side restraining assembly 24.

With reference back to FIG. 2, the safing signal being HIGH from points A–B, which represents the safing function being ON, is found at the output of OR function 148. It is to be appreciated that the output of 148 being HIGH or ON represents an affirmative safing signal. Similarly, the safing signal being HIGH from points C–D, which represents the safing function being ON, is found at the output of OR function 158. It is to be appreciated that an affirmative safing signal is represented when the output of 158 is a digital HIGH.

The discrimination signal being HIGH from points E–F (FIG. 3) corresponds to the output of timer F 168 being HIGH for that time period. It is to be appreciated that an affirmative discrimination signal is represented where the output of timer function 168 is a digital HIGH. Likewise, the discrimination signal being HIGH from points G–H (FIG. 4) corresponds to the output of AND function 180 being HIGH.

It is to be appreciated that an affirmative discrimination signal is represented where the output of 180 is a digital HIGH.

With continuing reference back to FIG. 6 the simultaneous occurrence of an affirmative safing signal and an affirmative discrimination signal as represented by the overlap of lines A–B and E–F (FIG. 5A), respectively, is represented by the output of AND function 186 where the output is a digital HIGH. Similarly, the simultaneous occurrence of an affirmative safing signal and an affirmative discrimination signal as represented by the overlap of lines A–B and G–H (FIG. 5B), respectively, is indicated by the output of AND function 188 where the output is a digital HIGH.

The simultaneous occurrence of an affirmative safing signal and an affirmative discrimination signal as represented by the overlap of lines C–D and E–F (FIG. 5C), respectively, is represented by the output of AND function 190 where the output is a digital HIGH. Likewise, the simultaneous occurrence of an affirmative safing signal and an affirmative discrimination signal as represented by the overlap of lines C–D and G–H (FIG. 5D), respectively, is represented by the output of AND function 192 where the output is a digital HIGH.

Referring back to FIGS. 1 and 6, the output of OR function 196 of the controller 70 is connected to the actuator drive circuit of the side restraining assembly 24. As mentioned above, whenever the signal applied to the side restraining assembly 24 is a digital HIGH, the signal indicates the occurrence of a deployment crash condition, i.e., the simultaneous occurrence of an affirmative safing signal and an affirmative discrimination signal. Accordingly, whenever the signal out of OR function 196 is a digital HIGH, the actuatable restraining device of the side restraining assembly 24 is actuated.

Accordingly, in response to the simultaneous occurrence of an affirmative safing signal and an affirmative discrimination signal, as represented by the overlap of lines A–B and E–F, A–B and G–H, C–D and E–F, and/or C–D and G–H, the present invention actuates the restraining device of the side restraining assembly 24. Similar control is provided for the passenger side restraining assembly 26.

Referring to FIGS. 7A–7D, a control process, in accordance with the present invention, will be appreciated. The process starts at step 300. During this step, memories are cleared, initial flag settings are made, etc. The process then proceeds to step 302 where the outputs from the accelerometers 28, 50, 52 are monitored. In step 304, the controller 70 determines values needed for control of the restraining devices. For the driver's side control, |A_MA_28_Y|, |A_MA_50_Y|, Vel_50_Y, and DISPL_52_X are determined. For the remainder of the control process, parallel processing branches are shown. Those skilled in the art will appreciate that these steps may occur in different order and that jumping back-and-forth between steps is possible to achieve the desired goal. The paths are shown in parallel for purposes of explanation only.

In step 310, a determination is made as to whether the value |A_MA_50_Y| is greater than the safing immunity value 75. This determines if the value is outside of the immunity box 74 as occurs after point A in FIG. 2. If the determination is affirmative, the safing function A–B is turned ON in step 312 and flag B is set in step 314. If the determination is negative, which means the values are possibly still within the immunity box 74, a determination is made in step 316 as to whether flag B has been set, i.e., have the values been outside of the immunity box 74 in the past?

If the determination in step 316 is affirmative (the values were previously outside of the immunity box 74), the process makes a determination in step 318 as to whether timer B 146 is timing out or running. If the determination is negative, the timer is started in step 320. This would be the first pass through this leg of the process after the values first are outside of the immunity box. From either step 320 or from an affirmative determination in step 318 (i.e., the timer B 146 was already running), a determination is made in step 322 as to whether timer B has timed out. As mentioned, the time period for timer B is predetermined in response to empirical testing or modeling. From an affirmative determination in step 322, the process turns OFF the safing function in step 324 and flag B would be reset.

From steps 314, 324, or negative determinations in steps 316 or 322, the process proceeds to step 330 where a determination is made as to whether safing A–B is ON when either discrimination determinations E–F or G–H is ON. If the determination 330 is affirmative, the restraining device associated with the driver's side assembly 24 is actuated in step 332. If the determination is negative, the process proceeds to step 334 where a determination is made as to whether safing C–D is ON when either discrimination determinations E–F or G–H is ON. If the determination 334 is affirmative, the restraining device associated with the driver's side assembly 24 is actuated in step 332. If the determination is negative, the process returns to step 302.

The process further makes a determination in step 340 as to whether the value DISPL_52_X is greater than the safing immunity value 76. This determines if the value is outside of the immunity box 74 as occurs after point C in FIG. 2. If the determination is affirmative, the safing function C–D is turned ON in step 342 and a D flag is set in step 344. If the determination is negative, which means the values are possibly still within the immunity box 74, a determination is made in step 346 as to whether flag D has been set, i.e., have the values been outside of the immunity box 74 in the past? If the determination in step 346 is affirmative (the values were previously outside of the immunity box 74), the process makes a determination in step 348 as to whether timer D 156 is timing out or running. If the determination is negative, the timer D is started in step 350. This would be the first pass through this leg of the process after the values first are outside of the immunity box. From either step 350 or from an affirmative determination in step 348 (i.e., the timer D 156 was already running), a determination is made in step 352 as to whether timer D has timed out. As mentioned, the time period for timer D is predetermined in response to empirical testing or modeling. From an affirmative determination in step 352, the process turns OFF the safing function C–D in step 354 and flag D would be reset. From steps 344, 354, or negative determinations in steps 346 or 352, the process proceeds to step 330 as described above.

The process makes a further determination in step 360 as to whether the value |A_MA_28_Y| is greater than the discrimination threshold value 78. If the determination is affirmative, a determination is made in step 362 as to whether the value Vel_50_Y is greater than the immunity threshold 79. If that determination 362 is affirmative, the discrimination threshold G–H is turned ON in step 364 and the H flag is set in step 366. From step 366, the process will proceed to step 330 and continue as described above.

From a negative determination in step 362 the F flag is set in step 370. From a negative determination in step 360, a determination is made in step 368 as to whether flag F is ON or set. If the determination in step 368 is affirmative, meaning that the value |A_MA_28_Y| is greater than the discrimination threshold 78 and VEL_50_Y is still within the immunity box 77, the process proceeds to step 372. In step 372, a determination is made as to whether Vel_50_Y is greater than the immunity threshold value 79. If the determination if affirmative in step 372, the discrimination value is turned ON in step 374. A determination is made in step 376 as to whether the timer F is running. If the timer is not running, the timer F is turned ON in step 378. From step 378 or an affirmative determination in step 376, a determination is made in step 380 as to whether the timer F has timed out. If the timer has timed out, the discrimination state E–F is turned OFF in step 382 and flag F would be reset. A determination would also be made as to whether the velocity value VEL_50_Y is less than the velocity reset threshold 136. If affirmative, the state of flag F would be reset. From step 382 or step 370, or from negative determinations in step 368, step 372, or step 380, the process would proceed to step 330 as described above.

From a negative determination in step 360, another determination is made in step 390 as to whether the flag H has been set. If the determination is affirmative, a determination is made in step 392 as to whether timer H is running. If the determination is negative, the timer H is turned ON in step 394. From either step 394 or an affirmative determination in step 392, a determination is made in step 396 as to whether the timer H has timed out. If the timer has timed out, the discrimination state G–H is turned OFF in step 398 and flag H would be reset. A determination would also be made as to whether the velocity value VEL_50_Y is less than the velocity reset value 136. If affirmative, the state of flag H would be reset. From either step 398 or from negative determinations in step 390 or step 396, the process proceeds to step 330 as described above.

The process of FIGS. 7A–7D provides for extensions in time for safing functions and discrimination determinations with immunity boxes to permit the "catching" of certain crash events to control an active restraining system. The restraining device is actuated when an affirmative safing function and an affirmative discrimination determination overlap in time.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling an actuatable restraining device of a vehicle, comprising:

first crash sensor sensing a vehicle crash condition and providing a first crash sensor signal indicative thereof; and actuator controller comparing said first crash sensor signal against an immunity threshold and enabling actuation of the actuatable restraining device when said first crash sensor signal is greater than said immunity threshold and for a time after the first crash sensor signal becomes less than said immunity threshold.

2. The apparatus of claim 1 wherein said first crash sensor is mounted in the vehicle so as to sense crash acceleration in a direction transverse to a front-to-rear axis of the vehicle and the actuatable restraining device is a side restraining device.

3. The apparatus of claim 1 further including a second crash sensor sensing crash acceleration and providing a second crash sensor signal indicative thereof, said actuator controller including means to actuate the restraining device only when said actuatable restraining device is enabled and said second crash sensor signal indicates a deployment crash event is occurring.

4. The apparatus of claim 1 wherein said immunity threshold is functionally related to crash acceleration.

5. The apparatus of claim 1 where said immunity threshold is functionally related to crash displacement.

6. An apparatus for controlling an actuatable restraining device of a vehicle, said apparatus comprising:

safing crash acceleration sensor mounted to said vehicle and providing a crash acceleration signal;

safing processing means including a safing immunity box defined by a predetermined crash acceleration value and a predetermined crash displacement value, said safing processing means providing an affirmative safing signal when a determined crash metric value from said crash acceleration signal is outside of said safing immunity box and continuing said affirmative safing signal for an enhanced time after said determined crash metric value reenters said safing immunity box, said safing means providing an enable signal in response to said affirmative safing signal.

7. The apparatus of claim 6 wherein safing crash acceleration sensors measure sideways crash acceleration and wherein said immunity box is defined by a sideways acceleration value and a front-to-rear crash displacement value.

8. The apparatus of claim 6 further including discrimination determining means for monitoring a crash condition of the vehicle and for providing an affirmative crash discrimination signal when a deployment crash condition is determined to be occurring; and actuator control means for actuating said actuatable restraining device in response to a simultaneous occurrence of the enable signal from said safing means and said affirmative crash discrimination signal.

9. An apparatus for controlling an actuatable side restraining device of a vehicle, said apparatus comprising:

safing means for monitoring crash acceleration signals and determining a sideways crash acceleration value and a front-to-rear crash displacement value of the vehicle and providing an affirmative safing signal when at least one of the sideways crash acceleration value and the front-to-rear crash displacement value exceeds an associated safing immunity threshold;

discrimination determining means including a discrimination immunity value defined by a predetermined sideways crash velocity value for providing an affirmative discrimination signal for a time after an occurrence of a determined discrimination crash metric value exceeding a discrimination threshold value while being less than said discrimination immunity value and subsequently exceeding said discrimination immunity value; and actuator control means for actuating said actuatable side restraining device in response to a simultaneous occurrence of an affirmative safing signal and an affirmative discrimination signal.

10. An apparatus for controlling an actuatable side restraining device of a vehicle, said apparatus comprising:

safing means for monitoring crash acceleration signals and determining a sideways crash acceleration value and a front-to-rear crash displacement value of the vehicle and providing an affirmative safing signal when at least one of the sideways crash acceleration value and front-to-rear crash displacement value exceeds an associated safing immunity threshold;

discrimination determining means including a discrimination immunity value defined by a predetermined sideways crash velocity value for providing an affirmative discrimination signal when a determined crash metric value exceeds a discrimination threshold value while exceeding said discrimination immunity value, said affirmative discrimination signal continuing for an enhanced time after said determined crash metric value falls below said discrimination threshold value; and actuator control means for actuating said actuatable side restraining device in response to a simultaneous occurrence of an affirmative safing signal and an affirmative discrimination signal.

11. An apparatus for controlling an actuatable side restraining device of a vehicle, said apparatus comprising:

safing means for monitoring crash acceleration signals and determining a sideways crash acceleration value and a front-to-rear crash displacement value of the vehicle and providing an affirmative safing signal when at least one of the sideways crash acceleration value and the front-to-rear crash displacement value exceeds an associated safing immunity threshold;

discrimination determining means including a discrimination immunity value defined by a predetermined sideways crash velocity value for providing an affirmative discrimination signal for (i) a first time after a determined crash metric value has exceeded a discrimination threshold value while being less than said discrimination immunity value and has subsequently exceeded said discrimination immunity value, and (ii) when said determined crash metric value exceeds said discrimination threshold value while exceeding said discrimination immunity value, and continuing for an enhanced time after said determined crash metric value falls below said discrimination threshold value; and actuator control means for actuating said actuatable side restraining device in response to a simultaneous occurrence of an affirmative safing signal and an affirmative discrimination signal.

12. An apparatus for controlling an actuatable side restraining device of a vehicle, said apparatus comprising:

safing means including a safing immunity box defined by a predetermined sideways crash acceleration value and a predetermined front-to-rear crash displacement value for providing an affirmative safing signal when a first determined crash metric value is outside of said safing immunity box and continuing said affirmative safing signal for an enhanced time after said first determined crash metric value reenters said safing immunity box;

discrimination determining means including a discrimination immunity value defined by a predetermined sideways crash velocity value for providing an affirmative discrimination signal (i) for a time after a second determined crash metric value has exceeded a discrimination threshold value while being less than said discrimination immunity value and has subsequently exceeded said discrimination immunity value, and (ii) when said second determined crash metric value exceeds said discrimination threshold value while exceeding said discrimination immunity value and continuing for an enhanced time after said second determined crash metric value falls below said discrimination threshold value; and actuator control means for actuating said actuatable restraining device in response to a simultaneous occurrence of an affirmative safing signal and an affirmative discrimination signal.

13. A method for controlling an actuatable side restraining device of a vehicle comprising the step of:

sensing a vehicle crash condition and providing a crash acceleration signal indicative thereof;

comparing the crash acceleration signal against an immunity threshold; and enabling actuation of the actuatable side restraining device when the crash acceleration signal is greater than the immunity threshold and for a time after a crash acceleration signal becomes less than the immunity threshold.

14. A method for controlling an actuatable restraining device of a vehicle comprising the steps of:

monitoring a vehicle crash condition;

providing an affirmative safing signal when a determined crash metric value response to the monitored crash condition is outside of a safing immunity box defined by a predetermined crash acceleration value and a predetermined crash displacement value;

continuing said affirmative safing signal for an enhanced time after the determined crash metric value reenters the safing immunity box;

providing an affirmative discrimination signal when a monitored discrimination crash condition exceeds a discrimination threshold; and actuating said actuatable side restraining device in response to a simultaneous occurrence of an affirmative safing signal and an affirmative discrimination signal.

15. A method for controlling an actuatable side restraining device of a vehicle comprising the steps of:

monitoring a sideways crash acceleration value and a front-to-rear crash displacement value of the vehicle;

providing an affirmative safing signal when at least one of the crash acceleration value and the front-to-rear crash displacement value exceeds an associated safing immunity threshold;

determining a discrimination crash metric value in response to sideways crash acceleration;

providing an affirmative discrimination signal for a time after the determined discrimination crash metric value has exceeded a discrimination threshold value while being less than a discrimination immunity value and has subsequently exceeded the discrimination immunity value; and actuating the actuatable side restraining device in response to a simultaneous occurrence of an affirmative safing signal and an affirmative discrimination signal.

16. A method for controlling an actuatable side restraining device of a vehicle comprising the steps of:

monitoring a sideways crash acceleration value and a front-to-rear crash displacement value of the vehicle;

providing an affirmative safing signal when at least one of the crash acceleration value and the front-to-rear crash displacement value exceeds an associated safing immunity threshold;

determining a discrimination crash metric value in response to sideways crash acceleration;

providing an affirmative discrimination signal when the determined discrimination crash metric value exceeds a discrimination threshold value while exceeding a discrimination immunity value;

continuing for an enhanced time the affirmative discrimination signal after the determined discrimination crash metric value falls below the discrimination threshold value; and actuating the actuatable side restraining device in response to a simultaneous occurrence of an affirmative safing signal and an affirmative discrimination signal.

17. A method for controlling an actuatable side restraining device of a vehicle comprising the steps of:

monitoring a sideways crash acceleration value and a front-to-rear crash displacement value of the vehicle;

providing an affirmative safing signal when at least one of the crash acceleration value and the front-to-rear crash displacement value exceeds an associated safing immunity threshold;

determining a discrimination crash metric value in response to sideways crash acceleration;

providing an affirmative discrimination signal for a first time after the determined discrimination crash metric value has exceeded a discrimination threshold value while being less than a discrimination immunity value and has subsequently exceeded the discrimination immunity value, and when the determined discrimination crash metric value exceeds the discrimination threshold value while exceeding the discrimination immunity value and continuing the affirmative discrimination signal for a second time after the determined discrimination crash metric value falls below the discrimination threshold value; and actuating the actuatable side restraining device in response to a simultaneous occurrence of an affirmative safing signal and an affirmative discrimination signal.

18. A method for controlling an actuatable side restraining device of a vehicle comprising the steps of:

providing an affirmative safing signal when a first determined crash metric value is outside of a safing immunity box defined by a predetermined sideways acceleration value and a predetermined front-to-rear displacement value;

continuing the affirmative safing signal for an enhanced time after the first determined crash metric value reenters the safing immunity box;

providing an affirmative discrimination signal for a first time after a second determined crash metric value has exceeded a discrimination threshold value while being less than a discrimination immunity value and has subsequently exceeded the discrimination immunity value, and when the second determined crash metric value exceeds the discrimination threshold value while exceeding the discrimination immunity value and continuing the affirmative discrimination signal for an enhanced time after the second determined crash metric value falls below the discrimination threshold value; and actuating the actuatable side restraining device in response to a simultaneous occurrence of an affirmative safing signal and an affirmative discrimination signal.

* * * * *